July 28, 1942.					J. P. MILLER						2,291,096
						TEMPLE CONNECTION
						Filed April 17, 1939
FIG. 1.
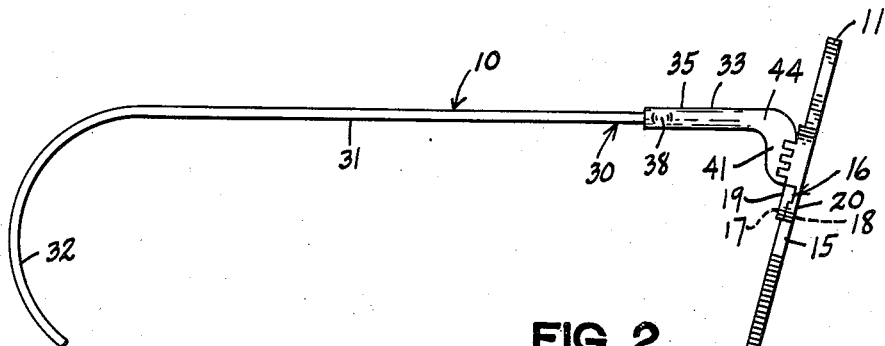
FIG. 4.
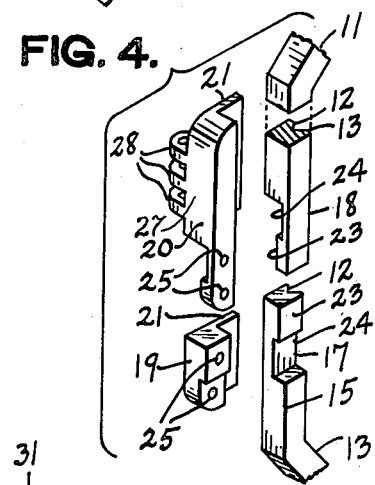
FIG. 2.
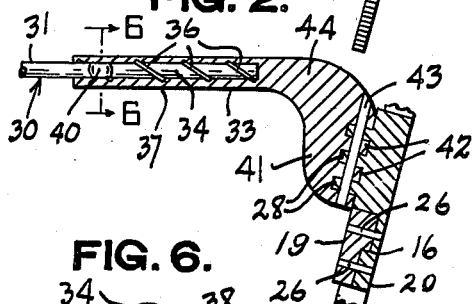
FIG. 6.
FIG. 3.
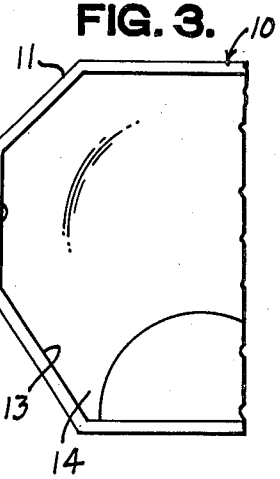
FIG. 5.    FIG. 7.
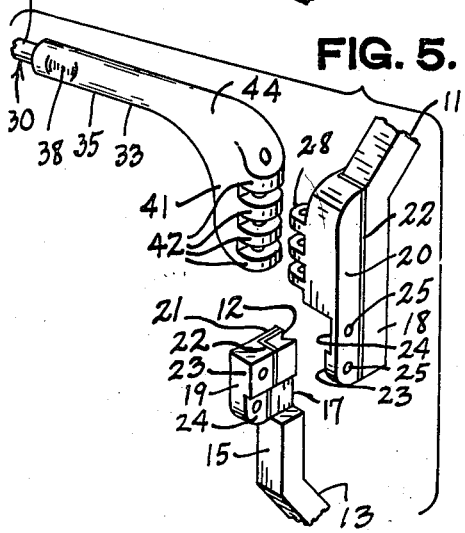
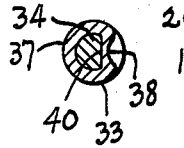
INVENTOR:
Joy P. Miller
BY
ATTORNEYS.

Patented July 28, 1942

2,291,096

UNITED STATES PATENT OFFICE 2,291,096

TEMPLE CONNECTION

Joy P. Miller, Ashland, Nebr.

Application April 17, 1939, Serial No. 268,368

1 Claim. (Cl. 88—52)

The invention relates to improvements in temple connections and the primary object is the provision of a connection which will not tend to loosen in daily wear and use.

Another object is to provide an improved temple for spectacles.

The invention also aims to provide for the adjustment of spectacles for different temple widths and alignments to fit the facial and optical characteristics of a wearer.

Other objects and advantages of the invention will become apparent during the course of the following detailed description, taken in connection with the accompanying drawing, forming a part of this specification, and in which drawing:

Figure 1 is a view in side elevation of a preferred form of spectacle frame.

Figure 2 is a vertical sectional detail view of a combined eye-wire and temple joint construction preferably forming a part of the spectacle frame.

Figure 3 is a fragmentary view in front elevation of the spectacle frame.

Figure 4 is a perspective view showing portions of the combined eye-wire and temple joint construction in disassembled relation.

Figure 5 is a perspective view showing portions of the combined eye-wire and temple joint construction in partially assembled relation.

Figures 6 and 7 are enlarged cross-sectional detail views substantially on the line 6—6 of Figure 2 and showing the two piece temple before and after joining.

In the drawing, which for the purpose of illustration shows only a preferred embodiment of the invention and wherein similar reference characters denote corresponding parts throughout the several views, the spectacles 10 may include a polygonal eye-wire 11, such as the "octagon drop" eye-wire illustrated. This eye-wire preferably is of rectangular cross-sectional outline and provided with a channel 12 at the inside 13 of the eye-wire for the reception of a suitable glass 14. This "octagon drop" eye-wire provides a straight temporal bar 15 which, in the present invention, is provided with a special rabbet joint 16 having overlapping end portions 17—18 including ears 19—20 extending from the side of the eye-wire opposite its channeled inside 13. These ears 19—20 may be formed in any suitable manner. In the example shown, the ears 19—20 are provided with flanges 21 adjacent the facial side of the eye-wire so that when the ears are secured to the eye-wire as by solder 22, a strong and permanent joint will be produced. The adjacent sides of the overlapping end portions 17—18 may be formed each with a lug 23 and groove 24, the lug of either end portion interfitting with the groove of the other end portion. Extending through the ears 19—20 are openings 25 transversely of the lugs 23 and grooves 24 and aligning when the end portions 17—18 are overlapped so as to receive suitable locking pins 26, such as solder rivets or other permanent fasteners.

The ear 20 may include a portion 27 extending upwardly beyond the overlapping end portions of the rabbet joint 16, and provided at the facial side of the eye-wire with rearwardly extending hinge knuckles 28, for pivotal attachment of the eye-wire to the temple 30.

Referring now to the temple 30 in detail, the same may include a shaft 31 having an ear-engaging hook end 32 and a connector 33 for coupling the butt end 34 of the temple shaft to the hinge knuckles 28 of the eye-wire.

The temple connector 33 may include a tubular shank end portion 35 providing a socket for the butt end 34 of the temple shaft. Preferably, the latter is provided on its periphery with a lazy thread 36 engaging the tubular wall 37 defining the socket. This tubular wall may include a section 38 of reduced thickness. In the example shown more particularly in Figures 6 and 7 of the drawing, the tubular wall 37 is of annular outline in cross-section and initially provided with a peripheral notch 39, as by removal of a segment of material therefrom, as illustrated in Figure 6.

Subsequently, the reduced section 38 is indented into contact with the walls of a peripheral notch 40 in the butt end of the temple, formed as by removal of a segment of material therefrom, to produce a permanent joint between the temple butt 34 and connector 33, as shown in Figure 7.

Extending from the shank end portion 35 of the connector is a laterally offset butt end portion 41 provided with a plurality of aligning hinge knuckles 42 pivotally interconnected with the knuckles 28 carried by the eye-wire, for swinging of the temple, as by a suitable pin 43, such as a rivet or solder pintle. In the drawing, four hinge knuckles 42 and three co-acting hinge knuckles 28 are shown, but it will be understood that the number may vary. By providing a plurality of knuckles, the bearing surface is increased and a more rigid joint is formed.

The neck-like juncture 44 between the shank and butt end portions of the connector preferably is of solid or continuous cross-section in contradistinction to a tubular, laminated or otherwise interrupted cross-section, and the material of which it is formed may be such that, although resistant to casual or accidental bending, it will permit intentional bending in order to adjust the temple and eye-wire to fit the facial and optical characteristics of a wearer.

While I have illustrated and described a specific spectacle frame, it will be understood that the various features of the invention are applicable not only to ophthalmic mountings, but also to sunglasses, eyeshields, goggles and similar devices.

Various changes may be made in the form of invention herein shown and described without departing from the spirit of the invention or the scope of the following claim.

I claim:

A temple comprising a connector of relatively soft pliable material and including a tubular shank having a peripheral wall provided with a circumferential portion of reduced thickness and defining a socket, a hinge portion and a juncture portion intermediate said shank and hinge portion forming a bendable neck and a temple shaft including a butt having a segmental notch in its periphery, and screw threaded means on the periphery of the butt securing the butt within the socket, the circumferential portion of reduced thickness being indented into the segmental notch of the temple butt.

JOY P. MILLER.